Dec. 17, 1968 R. W. STOFFEL 3,416,747
AUTOMATIC LOCKING ROTARY RETRACTING DEVICE
Filed June 16, 1967 2 Sheets-Sheet 1

INVENTOR.
ROBERT W. STOFFEL
BY
ATTORNEYS

Dec. 17, 1968  R. W. STOFFEL  3,416,747
AUTOMATIC LOCKING ROTARY RETRACTING DEVICE
Filed June 16, 1967  2 Sheets-Sheet 2

INVENTOR.
ROBERT W. STOFFEL
BY
Hawke, Knass & Gifford
ATTORNEYS

United States Patent Office 3,416,747
Patented Dec. 17, 1968

3,416,747
AUTOMATIC LOCKING ROTARY RETRACTING DEVICE
Robert W. Stoffel, Ferndale, Mich., assignor to Jim Robbins Seat Belt Company, Royal Oak, Mich.
Filed June 16, 1967, Ser. No. 646,706
12 Claims. (Cl. 242—107.4)

ABSTRACT OF THE DISCLOSURE

A rotary seat belt retractor having a cam and a follower mounted on a wind-up shaft. The cam and follower have complementary cam contours formed symmetrically about an axis offset from the axis of rotation of the wind-up member. The cam and follower rotate as a unit with the wind-up shaft when the rotational acceleration of the wind-up shaft is less than a predetermined magnitude, but rotate relative to one another at the predetermined magnitude to cause a peripheral abutment on the follower to move radially outwardly into locking engagement with a circular ratchet.

Background of the invention (1) *Field of the invention.*—This invention relates to automatic locking safety seat belt retractors and more specifically to an inertia responsive cam and follower retractor having an abutment normally disengaged from a circular ratchet when the wind-up member rotates at a rotational acceleration less than a predetermined rate, but which reacts to the wind-up member rotating at the predetermined rate to radially displace the abutment radially outwardly from the axis of rotation of the wind-up member and into engagement with a circular ratchet.

(2) *Description of the prior art.*—Automatic locking retractors for vehicle safety seat belts are normally constructed to permit the occupant of the safety seat belt to perform normal movements in a relatively unrestricted manner under normal driving conditions even though embraced by the seat belt assembly. The seat belt freely extends from a stored wound-up position around a spring biased wind-up reel fixed to the vehicle. When the vehicle experiences sudden and violent changes in its momentum such as result from a collision or a panic stop, and which produce a sudden extension of the belt from its wound-up position, locking means are triggered to engage the wind-up reel to prevent further rotation.

Considerable effort has been directed toward developing a retracting device with locking means which are sensitive to a sudden increase in the extension of the belt as reflected in the rotation of the wind-up reel and which will lock the reel in a fraction of a second. Various devices have been proposed wherein the locking of the reel is initiated by relative rotational movement between the reel and an inertia member. Such devices of the prior art require a great number of components which are difficult to manufacture, costly to assemble and often unreliable in operation.

It is the broad purpose of the present invention to provide an improved inertia operated locking device having a minimum number of components economically assembled to form a highly reliable device adapted for modern high production techniques.

Summary

The preferred embodiment of the present invention is described with reference to a spring-biased wind-up reel mounted for rotation on a base adapted for attachment to a relatively fixed part of the vehicle. The terminal end of the seat belt is attached to the wind-up reel so that rotation of the reel in a wind-up direction wraps the belt in a wound-up configuration and rotation of the reel in the opposite direction extends the belt from its stored wound-up position. The spring biased member acting between the shaft and the base produces a yieldable force on the reel tending to bias the reel in the wind-up direction. A cam carried by the wind-up reel has a circular cam surface formed about an axis spaced from the axis of rotation of the reel. A follower member having a substantially circular bore is mounted on the cam with the bore rotatably slidably engaged with the circular contour of the cam. Interengageable abutments carried by the follower and the cam limit the rotation of the follower between first and second annularly spaced positions.

A peripheral abutment on the follower is engageable with a circular ratchet fixed to the base. In one position, the follower abutment is radially inwardly spaced from the ratchet so that the wind-up reel can freely rotate. As the follower moves toward its second position, the abutment is radially outwardly displaced until it engages the ratchet to lock the reel against rotation. A spring bias member acts between the follower and the cam to maintain the follower in its first position so that the wind-up reel, the cam and the follower normally rotate as a unit. When the belt begins to extend from its stored position at a sharply accelerated rate, this extension is reflected in a sharply increased rotational acceleration of the wind-up reel. The inertia of the follower displaces the follower around the cam toward its second position so that the peripheral abutment moves into locking engagement with the ratchet. When the forces producing the accelerated rate of extension of the belt have been relieved and the inertia of the follower reduced, the spring bias member rotates the follower back toward its initial position so that the belt can freely extend and retract under the influence of the wind-up spring.

It is therefore an object of the present invention to provide a rotary seat belt retractor having an automatic locking mechanism comprising a relatively few components and which is responsive to the relative rotational movement between a wind-up reel and an inertia member to trigger the locking mechanism from an unlocked to a locked condition.

It is another object of the present invention to provide an inertia-operated automatic locking mechanism for a rotary seat belt retractor having a wind-up reel rotatably mounted to a base including a cam carried by the wind-up reel and having a circular cam portion formed about an axis eccentric with respect to the axis of rotation of the reel, an inertia follower member having a substantially circular bore engaged with the circular contour of the cam and movable between relative positions about the eccentric axis, and cooperating abutments on the follower and the base which move into and out of mutually engaging positions as the follower rotates relative to the cam.

Still further objects and advantages of the present invention will become readily apparent to one skilled in the art to which the invention pertains upon reference to the following detailed description.

Description of the drawings

The description refers to the accompanying drawings in which like reference characters refer to like parts throughout the several views and in which.

*Description of the preferred embodiment*

Figure 1:
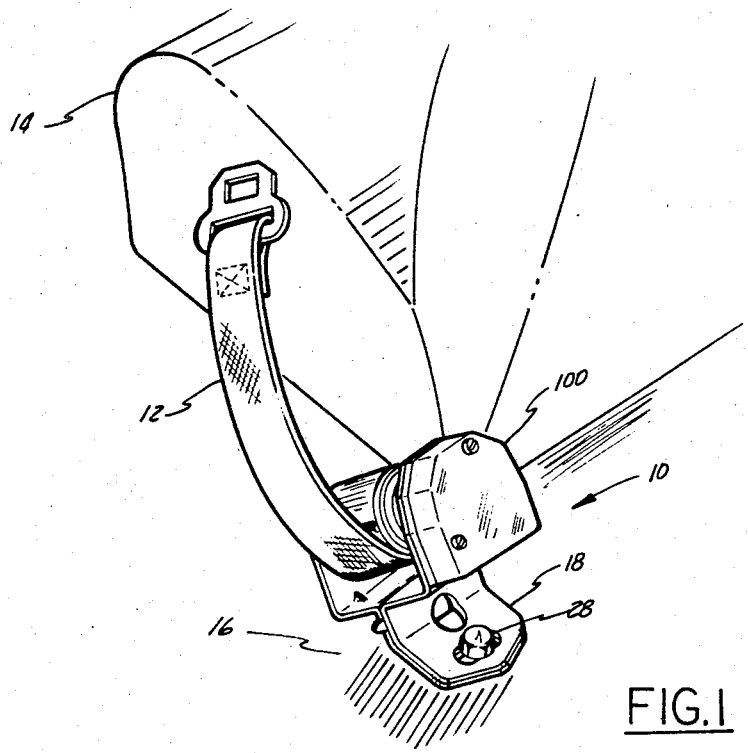
FIGURE 1 is a perspective view of a seat mounted on the floor of a vehicle with a retracting device illustrating the preferred embodiment of the invention.

Now, referring to the drawings, FIGURE 1 illustrates a preferred safety seat belt retracting device at 10 for controlling the extension and retraction of a seat belt 12 having a length permitting it to partially encircle the occupant of a conventional vehicle seat 14 mounted to the floor 16 of the vehicle.

The retracting device 10 provides a dual function. First, it anchors the terminal end of the seat belt 12 to a relatively fixed part of the vehicle to prevent sudden relative displacement of the occupant of the seat 14 with respect to the vehicle in the event of a sudden deceleration or other sudden and violent changes in the momentum of the vehicle.

Secondly, the retracting device 10 maintains the belt 12 in a stored position when the belt is not employed as a part of an occupant restraining system. Therefore, the retracting device 10 is illustrated as preferably being attached to the floor 16, however, it can be attached to any other relatively fixed part of the vehicle such as the seat 14.

Figure 2:
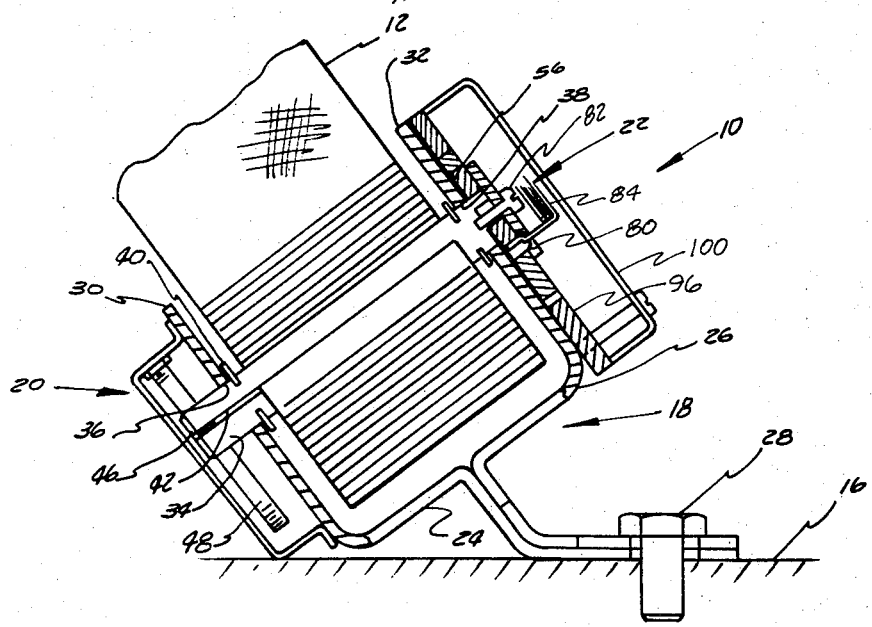
FIGURE 2 is an enlarged elevational sectional view through the retracting device of FIGURE 1.

Referring to FIGURE 2, the retracting device 10 comprises a bracket 18, a housing (not shown) enclosing the bracket 18, a wind-up unit 20 mounted on the bracket for controlling the longitudinal movement of the belt and a locking device 22 for controlling the operation of the wind-up unit 20. The locking device 22 normally permits the wind-up device to freely rotate between a wound-up position wherein the belt is wound in a stored condition and an extended direction wherein the belt is freely extended from its stored position.

The locking device 22 is operable to lock the wind-up unit 20 against rotation with respect to the bracket 18 in reaction to the belt 12 being extended at a sharply increased rate in a manner which will be subsequently described in detail.

The anchoring bracket 18 preferably comprises a pair of bracket sections 24 and 26 having their lower ends rigidly attached to the floor 16 of the vehicle by a threaded fastener 28. The bracket section 24 and 26 extend upwardly in the direction of movement of the belt 12 to form a pair of spaced parallel flanges 30 and 32.

A metal wind-up reel or shaft 34 is journaled for rotation in a pair of axially aligned apertures 36 and 38 formed in the flanges 30 and 32 respectively. A pair of clips 40 carried by the shaft 34 abut the inner surface of the flanges 30 and 32 and prevent the shaft 34 from avially shifting with respect to the flanges.

An axially extending slot 42 formed in the shaft 34 provides means for receiving the lower looped terminal end of the belt 12. Thus, when the belt 12 is extended its full length, tensile forces acting on the belt are transferred through the reel 34, and the bracket 18 to the floor 16.

The slotted end 46 of the reel 34 provides means for receiving the inner end of a coil spring 48 which is mounted adjacent the outer surface of the flange 30. The outer end of the spring 48 is attached to a cap member fixed to the flange 30. The spring 48 thus acts between the cap member and the shaft 34 to bias the reel 34 in a wind-up direction. The resiliency of the spring is selected so that it yields in response to a nominal pull out force applied to the belt 12 by the occupant of the seat 14. Thus, although the belt 12 is relatively freely extendable from its stored position, the spring 48 provides means for taking up any slack in the belt 12 when it is forming part of a restraining system and also for storing the belt 12 in a wound-up position around the reel 34 when the belt is not employed as part of the restraining system.

Figure 3:
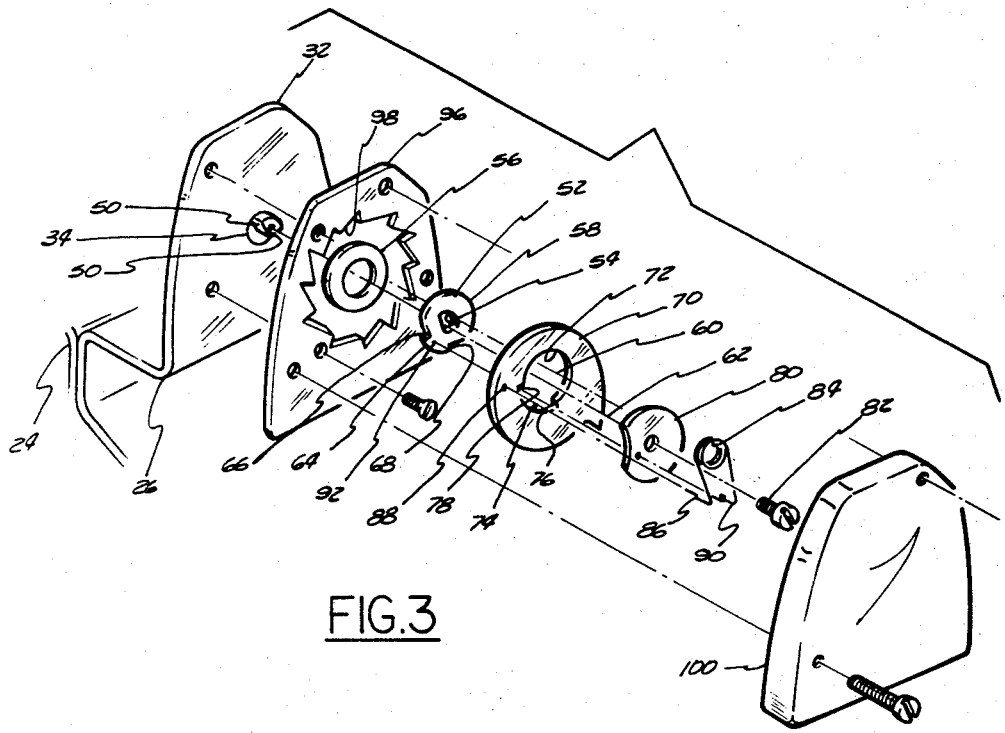
FIGURE 3 is a fragmentary view of the preferred retractor and with the automatic locking components shown in exploded relationship.

Now referring to FIGURES 2 and 3 for a detailed description of the locking mechanism 22, the end of the shaft 34 extends through the flange 32 and has a pair of cut-away converging surfaces 50. A cam member 52 having an aperture 54 formed complementary to the end of the reel 34 receives the end of the reel so that the cam 52 is locked against relative rotation with respect to the reel 34. A thin washer 56 is mounted on the end of the shaft 34 and provides a bearing surface between the inner surface of the cam 52 and the outer surface of the flange 32.

The cam 52 has a substantially circular contour 58 which is formed about an axis 60. The axis 60 is laterally displaced with respect to the axis 62 which forms an extension of the axis of rotation of the shaft 34.

The cam surface 58 terminates with a radial enlargement 64 having a pair of circumferentially spaced abutments 66 and 68.

A flat follower member 70 having an inner cam surface 72 with a circular contour complementary to the circular contour 58 of the cam 52 is mounted on cam 52.

The cam surface 72 terminates with a radial recess 74 having its ends defined by a pair of circumferentially spaced abutments 76 and 78.

The follower 70 is mounted on the cam 52 with the cam surfaces 72 and 58 rotatably and slidably engaged with one another. The abutments 66 and 68 of the cam 52 are spaced from one another a distance less than the abutments 76 and 78 of the follower so that the follower 70 can rotate with respect to the cam 52 about the axis 60.

A circular end plate 80 and a threaded fastener 82 which is threadably engaged with the end of the shaft 34 retains the cam 52 and the follower 70 on the end of the reel 34. A spring member 84 having a bent end 86 received by an aperture 88 in the follower 70 and an opposite bent end 90 received by an aperture 92 in the cam 52 normally maintains the cam and follower in the position illustrated in FIGURE 4 wherein the abutment 68 of the cam and the abutment 76 of the follower are in abutting relationship.

A radially extending abutment 94 is carried on the peripheral edge of the follower 70.

A ratchet plate 96 having an annular arrangement of ratchet teeth 98 is mounted on the flange 32 with the teeth inwardly directed toward the axis of rotation 62 of the reel 34. The teeth of the ratchet 98 are annularly arranged about the axis 62 and provide means for engaging the abutment 94 to lock the shaft 34 against rotation.

Figure 4:
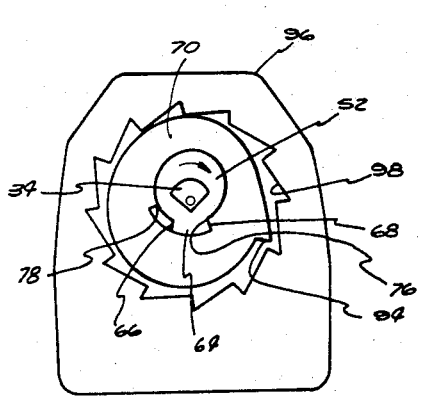
FIGURE 4 is a view illustrating the preferred cam and follower in their unlocked condition.
Figure 5:
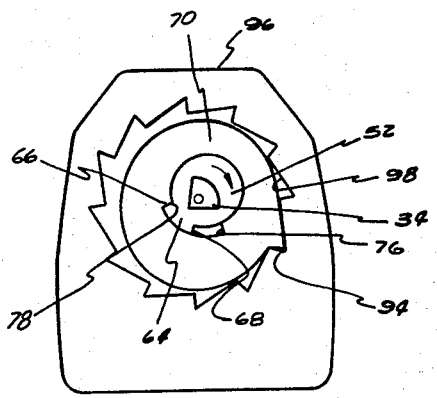
FIGURE 5 is a view similar to FIGURE 4 but with the follower rotated about the cam to the locked position.

As best seen in FIGURES 4 and 5, assuming the reel 34 is rotating in a clockwise direction with the cam 52 rotating with the reel, the spring 84 maintains the abutments 76 and 68 in an abutting relationship so that the follower 70 rotates together with the cam 52 and the shaft 34.

A sudden and predetermined rotational acceleration of the reel 34 produces a similar increase in the acceleration of the rotation of the cam 52. The follower member 70 has a mass such that this increase in rotational acceleration creates an inertia force acting on the follower in a counter-clockwise direction so that the follower commences to rotate about the cam 52 and the axis 60 with the abutments 66 and 78 approaching one another. As the follower 70 rotates about the cam 52, the abutment 94 on the peripheral edge of the cam moves radially outwardly from the axis of rotation 62 of the shaft 34 until it engages one of the ratchet teeth 98. Engagement of the abutment 94 with the ratchet teeth 98 stops rotation of the follower 70 so that the abutment 66 of the cam and the abutment 78 of the follower approach one another to lock the reel 34 to the ratchet plate 96 thereby preventing further rotation of the shaft 34 and extension of the belt 12.

Thus, it can be seen that a relatively sensitive locking mechanism has been described which employs the inertia of the follower 70 tending to resist the increase in rotational acceleration acting on the reel 34 and the cam 58. The spring 84 is chosen such that the increase in rotational acceleration necessary to produce relative movement of the follower about the cam 52 is such that the abutments 94 and 98 lock in a very short period of time with a minimum length of the belt 12 being extended after violent forces tending to displace the occupant from the seat 14 commence to act on the belt.

The circular contour 72 of the follower and the complementary circular contour 58 of the cam 52 provide a cntinual sliding engagement between the cam and the follower as the follower rotates relative to the cam about the eccentric axis 60.

A cover 100 fastened to the ratchet plate 96 encloses the components of the locking mechanism 22.

Although I have described but one embodiment of my invention, it is to be understood that various changes and revisions can be made therein without departing from the spirit of the invention as expressed in the scope of the appended claims.

I claim:
1. A device, comprising:
 (a) a base,
 (b) a winding reel mounted for rotation on said base about a first axis;
 (c) a first abutment fixed to said base and spaced from said first axis;
 (d) a cam member having a first contour formed substantially symmetrically about a second axis which is parallel to said first axis, said cam member being fixed to said winding reel for coacting rotation;
 (e) a follower member mounted on said cam member for rotation said follower member having a second contour complementary to said first contour and engaged therewith so that it is rotatable about the second axis between first and second positions;
 (f) a second abutment carried by said follower member, said second abutment being revolvable in a first orbit about said first axis when said follower member is in said first position and being movable toward a second orbit having a diameter greater than said first orbit when said follower member is moved toward said second position by rotation of the reel, said second abutment being engagable with said first abutment when said follower member is in said second position to lock said winding reel against rotation in at least one direction; and
 (g) means yieldably biasing said follower member toward said first position on said cam member below a predetermined rotational acceleration of said winding member, said biasing means being yieldable to the inertia of said follower member at said predetermined rotational acceleration so that said follower member is rotatable under the influence of its inertia about said second axis to said second position.

2. The device as defined in claim 1, wherein said cam member and said follower member have substantially circular contours in continual sliding engagement.

3. The device as defined in claim 1, wherein said first and second abutments are arranged in a plane which is transverse to said first axis.

4. The device as defined in claim 1, including abutment means for limiting the rotation of said follower member and said cam member, said abutment means defining the first and second positions of said follower member.

5. The device as defined in claim 1, wherein said cam member has a peripheral contour defined by a curved surface having all points equidistant from said second axis, and said follower member has a surface in sliding engagement with said peripheral contour, said sliding surface having a contour corresponding to said curved surface so that said follower member is rotatably slidably engaged with said cam member.

6. The device as defined in claim 5, wherein the peripheral ends of the curved surface of said cam member terminates with a pair of circumferentially spaced abutments and the sliding surface of said follower member has a pair of circumferentially spaced abutments, the pair of abutments on said follower member being engageable with the pair of abutments in said cam member to define the first and second positions of said follower member relative to said cam member.

7. The device as defined in claim 6, wherein said yieldably biasing means comprises a spring bias member having opposite ends acting between said cam and said follower member and providing a yieldable force opposing rotation of said follower member with respect to said cam member about said second axis.

8. The device as defined in claim 1, wherein said cam member and said follower member are releasably mounted on said winding reel.

9. The device as defined in claim 1, including second bias means coupling said winding reel and said base for urging said winding reel toward rotation in a wind-up direction, and wherein said follower member is movable relative to said cam member in response to inertial forces produced by said winding reel rotating in the direction opposite to said wind-up direction.

10. The device as defined in claim 1, wherein said cam and follower members rotate together with said follower member in said first position about said first axis when the rotational acceleration of said winding reel is less than said predetermined rotational aceleration.

11. The combination comprising:
 (a) a base,
 (b) a winding reel mounted on said base for rotation about an axis,
 (c) a first abutment carried by said base at a first distance from said axis,
 (d) a second abutment carried by said winding reel and rotatable therewith, said second abutment normally being rotatable in a circular orbit having a radius less than said first distance so that said first and second abutments are normally disengaged,
 (e) cam means mounted on said winding reel and operable to radially displace said second abutment from its circular orbit to a distance from said axis wherein said second abutment lockingly engages said first abutment to lock said winding reel against rotation, comprising:
  (1) a cam member having a cam surface formed symmetrically about a second axis, parallel to said first axis and at a fixed distance therefrom, said cam member being fixedly mounted to said winding reel;
  (2) a follower member with a predetermined mass having a cam surface complementary with the cam surface of said cam member and being mounted on said cam member with its cam surface engaged with the cam surface of the cam member for relative rotation between first and second positions about said second axis, said second abutment being carried on the peripheral edge of said follower member, and
  (3) bias means for maintaining said follower member in said first position, said bias means opposing relative rotation of said cam member and follower member below a predetermined rotational acceleration of said winding reel, and being yieldable to the inertia of said follower member produced by the reel rotating at said predetermined rotational acceleration so that said follower member is movable under its inertia to said second position and radially displaces said second abutment into a locking engagement with said first abutment.

12. The combination as defined in claim 11, wherein said second abutment is movable between lateral positions in a plane transverse to said first axis.

References Cited

UNITED STATES PATENTS 3,369,768  2/1968  Burns _____ 242—107.4
3,369,769  2/1968  Burns _____ 242—107.4

WILLIAM S. BURDEN, *Primary Examiner.*